United States Patent
Ma et al.

(10) Patent No.: US 6,573,691 B2
(45) Date of Patent: Jun. 3, 2003

(54) CONTROL SYSTEM AND METHOD FOR VOLTAGE STABILIZATION IN ELECTRIC POWER SYSTEM

(75) Inventors: Thomas Lai Wai Ma, Toronto (CA); Brooke Armstrong Stratton, Burlington (CA)

(73) Assignees: Hatch Associates Ltd., Mississauga (CA); Satcon Power Systems Canada Ltd., Mississauga (CA)

( * ) Notice: Subject to any disclaimer, the term of this patent is extended or adjusted under 35 U.S.C. 154(b) by 0 days.

(21) Appl. No.: 09/982,670

(22) Filed: Oct. 17, 2001

(65) Prior Publication Data

US 2003/0076075 A1 Apr. 24, 2003

(51) Int. Cl.$^7$ .............................. G05F 5/00; H02B 7/144
(52) U.S. Cl. ........................................ 323/209; 373/104
(58) Field of Search ................................ 323/205, 208, 323/209; 373/102, 104

(56) References Cited

U.S. PATENT DOCUMENTS

| | | |
|---|---|---|
| 2,450,159 A | 9/1948 | Pickslay |
| 2,632,862 A | 3/1953 | Stolz |
| 3,597,518 A | 8/1971 | Roberts |
| 3,767,832 A | 10/1973 | Bennett |
| 3,936,727 A | 2/1976 | Kelley, Jr. et al. |
| 3,987,359 A | 10/1976 | Thompson |
| 4,104,576 A * | 8/1978 | Frank .......................... 323/210 |
| 4,607,374 A | 8/1986 | Inagaki et al. |
| 5,115,447 A | 5/1992 | Bowman |
| 5,155,740 A | 10/1992 | Ao et al. |
| 5,239,554 A | 8/1993 | Gensini et al. |
| 5,255,285 A | 10/1993 | Aberl et al. |
| 5,438,588 A | 8/1995 | Wanner |
| 5,463,653 A * | 10/1995 | Du Parc et al. ............. 373/108 |
| 5,677,925 A | 10/1997 | Du Parc et al. |
| 5,991,327 A | 11/1999 | Kojori |
| 6,226,313 B1 * | 5/2001 | Thamodharan et al. ...... 373/102 |
| 6,274,851 B1 * | 8/2001 | Mulcahy et al. ............. 219/501 |

FOREIGN PATENT DOCUMENTS

| | | |
|---|---|---|
| EP | 0 033 842 | 1/1981 |
| EP | 0 429 744 A1 | 6/1991 |
| EP | 0 589 544 | 6/1993 |

OTHER PUBLICATIONS

R. Grunbaum, SVC Light: A Powerful, Means for Dynamic Voltage and Power Quality Control in Industry and Distribution, ABB Power Systems AB, AC Systems Division, Sweden.

* cited by examiner

*Primary Examiner*—Adolf Deneke Berhane
(74) *Attorney, Agent, or Firm*—Hodgson Russ LLP

(57) ABSTRACT

Variable shunt and series connected reactors are used in a complimentary combination in an electric arc furnace to provide improved flicker control. A power control system for an time-varying AC load, such as an electric arc furnace, connected to an AC power supply line includes a first variable reactance intermediate the power supply line and the load, and a second variable reactance connected in parallel with the power supply line. A control system is provided for (i) monitoring load current and adjusting the first variable reactance in response to changes in the monitored load current; and (ii) monitoring reactive power draw by the load and adjusting the second variable reactance in response to changes in the monitored reactive power draw. The first variable reactance and second variable reactance are each primarily used to mitigate flicker at different times during the load operation.

38 Claims, 7 Drawing Sheets

CONTROL SYSTEM AND METHOD FOR VOLTAGE STABILIZATION IN ELECTRIC POWER SYSTEM

BACKGROUND OF INVENTION

This invention relates in general to power control systems and in particular to a control system and method for voltage stabilization in an electric power system.

Time varying loads can result in unwanted voltage fluctuations in a power supply network. An example of such a load are alternating current (AC) electric arc furnaces, which are commonly used to melt and remelt ferrous materials such as steel, and to smelt non-ferrous materials. Such furnaces generally use high power arcs to generate heat energy in a refractory lined vessel, and include a power supply for controlling the electrical energy supplied to the arc. High power arcs are an energy conversion mechanism that behave as a non-linear time-varying impedance. Consequently, the voltage, current and power drawn by an arc furnace tends to fluctuate, causing disturbances to both the melting process and to the supply network. These disturbances can result in inefficiencies, increased equipment wear, disturbances to the power network, and in extreme cases damage to the supply network or arc furnace. The voltage disturbances that occur in the supply network arising from large and rapid fluctuations in the load current and power factor during certain operating stages of the furnace are often referred to as "flicker". Furnace flicker is a common problem for both furnace operators and power distributers. Power distributers will often place strict limits on flicker caused by furnaces that draw power from their distribution systems in order to reduce disturbances to such distribution systems.

Various technologies have been developed for power control and flicker reduction for arc furnaces. One commonly used technology that has been used on steel electric arc furnaces is the static VAR compensator (SVC). An SVC consists of a shunt connected harmonic filter bank and a shunt connected thyristor-controlled reactor, which operate in concert to lower voltage flicker or maintain a constant furnace power factor. The SVC operates by shunt injection of either capacitive or inductive reactive power, thereby maintaining a constant voltage by maintaining the total reactive power draw (MVAR) of the furnace balanced near zero (ie. neither inductive or capacitive). SVC's typically have a half cycle time delay due to thyristor commutation requirements. An example of an early SVC can be seen in U.S. Pat. No. 3,936,727.

SVC based arc furnace controllers dynamically supply reactive power by the controlled summation of constant capacitive MVAR and variable inductive MVAR. The controller compares load reactive power to a set point power factor and dynamically controls the summated MVAR to the set point. As an electric arc furnace frequently short circuits and open circuits on bore in of the furnace electrodes, the furnace reactive power swings vary from zero to 200% of the furnace transformer rating. An SVC is normally sized at 125% to 150% of the furnace rating and typically reduces flicker by approximately 40% to 50%. Some SVCs use a voltage set point, and adjust a shunt reactor to match a process voltage to the set-point voltage.

A variation of the SVC technology which has been developed relatively recently is known as STATCOM (Static Synchronous Compensator) or SVC Light, which consists of parallel connected insulated gate bipolar transistors (IGBT) powered by a DC capacitor voltage source. Response speed is a function of the IGBT switching frequency and the coupling reactor size.

Another flicker reduction technology is the smart predictive line controller (SPLC) that consists of a thyristor connected in series with the arc electrode and a harmonic filter bank. An SPLC functions as a dynamically controlled series reactor that uses predictive software to stabilize the current on a electric arc furnace. The SPLC reduces flicker by lowering arc:current fluctuations on the power systems. When arc current fluctuations are flat lined, the voltage flicker is reduced. An example of an SPLC can be seen in U.S. Pat. No. 5,991,327 issued Nov. 23, 1999.

Although existing technologies such SPLC's and SVC's have been used to mitigate voltage flicker to some extent, it is desirable to have a power control system that provided improved flicker regulation beyond that presently available.

SUMMARY OF INVENTION

According to the present invention, variable shunt and series connected reactors are used in a complimentary combination to provide improved flicker and power control for a time-varying load such as an arc furnace. According to another aspect, a series connected inductive reactor is varied either to stabilize current or real power draw depending on flicker levels.

According to one aspect of the invention, there is provided a power control system for an AC time-varying load connected to an AC power supply line. The power control system includes a first variable inductive reactor intermediate the power supply line and the load, a second variable reactor connected in parallel with the power supply line, and a control system for (i) monitoring load current and adjusting the first variable inductive reactor in response to changes in the monitored load current to reduce voltage flicker; and (ii) monitoring reactive power draw from the AC power supply line and adjusting the second variable reactor in response to changes in the monitored reactive power draw to reduce voltage flicker.

According to another aspect of the invention, there is provided a power control system for an AC electric arc furnace having an AC power supply line for applying power to an electrode. The system includes a variable inductive series reactor connected intermediate the power supply line and the electrode, a variable inductive parallel reactor connected in parallel with the power supply line, a harmonic capacitive filter bank connected in parallel with the power supply line, and a control system for mitigating voltage flicker on the power supply line. The control system includes (i) current stabilizing means for adjusting the inductive series reactor to stabilize an electrode current to control the voltage flicker; (ii) reactive power stabilizing means for adjusting the inductive parallel reactor to stabilize a reactive power draw from the AC power supply line to control the voltage flicker; and (iii) control means for monitoring voltage flicker on the power supply line and adjusting operating parameters of the current stabilizing means and the reactive power stabilizing means based on the monitored voltage flicker.

According to another aspect of the invention, there is provided a method for controlling voltage flicker in an AC power supply line having a time-varying load connected thereto, including (a) providing a variable inductive series reactor intermediate the power supply line an d the load; (b) providing a variable parallel reactor in parallel with the power supply line; (c) varying an inductance of the variable inductive series reactor to reduce voltage flicker; and (d) varying a reactance the variable parallel reactor to reduce voltage flicker. Preferably, in step (c) the inductance of the variable inductance series reactor is varied to reduce voltage flicker occurring primarily within a selected first frequency range, and in step (d) the reactance of the variable parallel reactor is varied to reduce voltage flicker occurring primarily within a selected second frequency range.

According to still a further aspect of the invention, there is provided a power control system for an AC power supply line having a time-varying load connected thereto, including a variable inductive reactor intermediate the power supply line and the load, a flicker meter for monitoring voltage flicker on the AC power supply line, a current stabilizer for varying the variable inductive reactor to stabilize a current draw from power supply line to reduce voltage flicker on the power supply line when the monitored voltage flicker is above a first threshold, and a real power stabilizer for varying the variable inductive reactor to stabilize a real power draw from the power supply line when the monitored voltage flicker is below a second threshold.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described by way of example only and with reference to the accompanying drawings of which.

DESCRIPTION OF THE PREFERRED EMBODIMENTS

Figure 1:
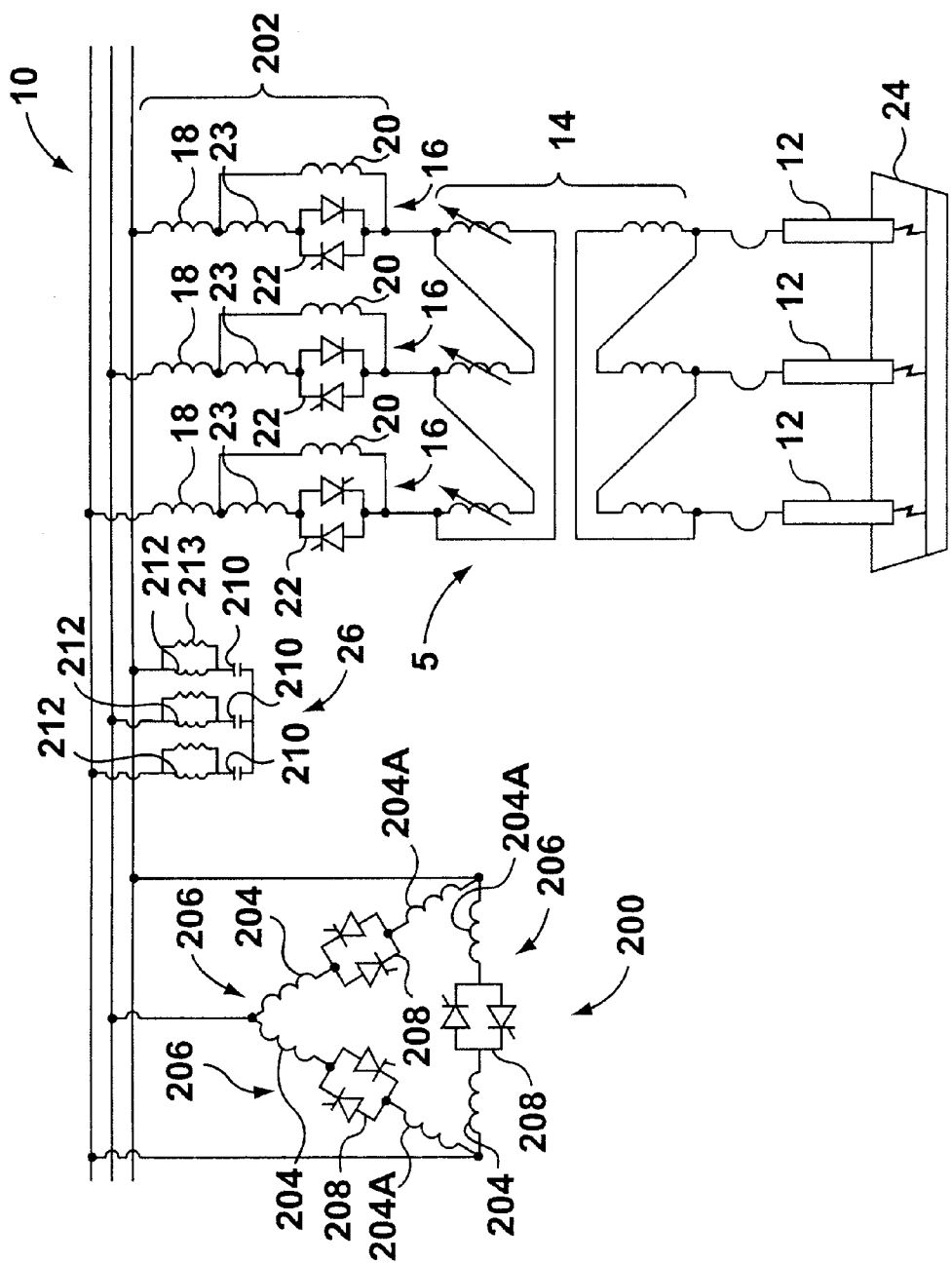
FIG. 1 is a simplified schematic of an electric arc furnace having a power supply in accordance with an embodiment of the present invention.

With reference to FIG. 1, an example of a three electrode AC electric arc furnace 5 having a power supply in accordance with preferred embodiments of the invention is shown. Three phase power is provided to the furnace 5 from a local supply bus 10. The supply bus 10 is connected to receive power from a utility power supply, or alternatively, from a local generating station. The furnace 5 includes three electrodes 12, with each electrode being associated with one of the three power phases. The arcing ends of electrodes 12 are positioned in furnace vessel 24 to melt a work material such as scrap metal, and are mounted such that their height can be adjusted. The electrodes 12 are connected to the furnace side (secondary windings) of a tapped furnace transformer 14. An inductive series reactor 202 is connected in series between the furnace 5 and the supply bus 10. Each of the three phases of the inductive series reactor 202 includes a series combination of a variable reactor 16 and a fixed reactor 18 connecting a respective phase of the supply side (primary windings) of the furnace transformer 14 to a corresponding line of the supply bus 10. In the illustrated embodiment, each variable reactor 16 includes an inductor 20 connected in parallel with a series combination of an inductor 23 and a thyristor switch 22. Each thyristor switch 22 preferably includes a pair of thyristors, or pairs of thyristor groups, arranged in opposite polarity to each other.

An inductive shunt reactor 200 is connected across the supply bus 10 in parallel with the series combination of the arc furnace 5 and inductive series reactor 202. The inductive shunt reactor 200 includes three variable reactors 206 connected in delta circuit relation. Each of the variable reactors 206 includes a series-connected pair of fixed inductors 204, 204A with an intermediate AC thyristor switch 208. Each thyristor switch 208 preferably includes a pair of thyristors, or pairs of thyristor groups, arranged in opposite polarity to each other.

As known in the art, a harmonic filter bank 26, which can be implemented using a shunt connected capacitive reactor, is connected to supply bus 10 to function as a source of compensating reactive current for removing harmonic distortions that occur as a result of the arcing process. In one configuration, the harmonic filter bank 26 includes at least one, and typically more, banks of fixed capacitors 210 connected to the supply bus 10 in wye connected circuit relation through respective tuning inductances 212 and damping resistors 213. The harmonic filter bank 26 is tuned to the predominant harmonic frequencies generated by the arcing process to impede these harmonics from entering the supply network. The harmonic filter bank 26 and variable inductive shunt reactor 200 are collectively a variable shunt reactor used to counteract the reactive power draw of the furnace and the inductive series reactor 202.

As will be explained in greater detail below, the present invention includes a control system that is used to actively control the operation of the inductive series reactor 202 and inductive shunt reactor 200 during the operation of the arc furnace 5 in order to reduce voltage flicker. Preferably, the operation of the reactors is also controlled to reduce real power fluctuations. The impedance of an electric arc furnace is primarily made up of resistance and inductance and changes rapidly and abruptly with changes in the melting conditions in the furnace. In particular, when a new charge of work product is placed in the furnace for melting the arcs experience abrupt and appreciable physical changes over a period of several minutes duration until the furnace charge assumes a more homogeneous nature. The varying resistance and impedance produce fluctuating changes in the phase and magnitude of the load (furnace) voltage relative to the supply system voltage, resulting in low frequency voltage flicker. As used herein in the context of flicker, frequency refers to the fluctuation rate.

Figure 2:
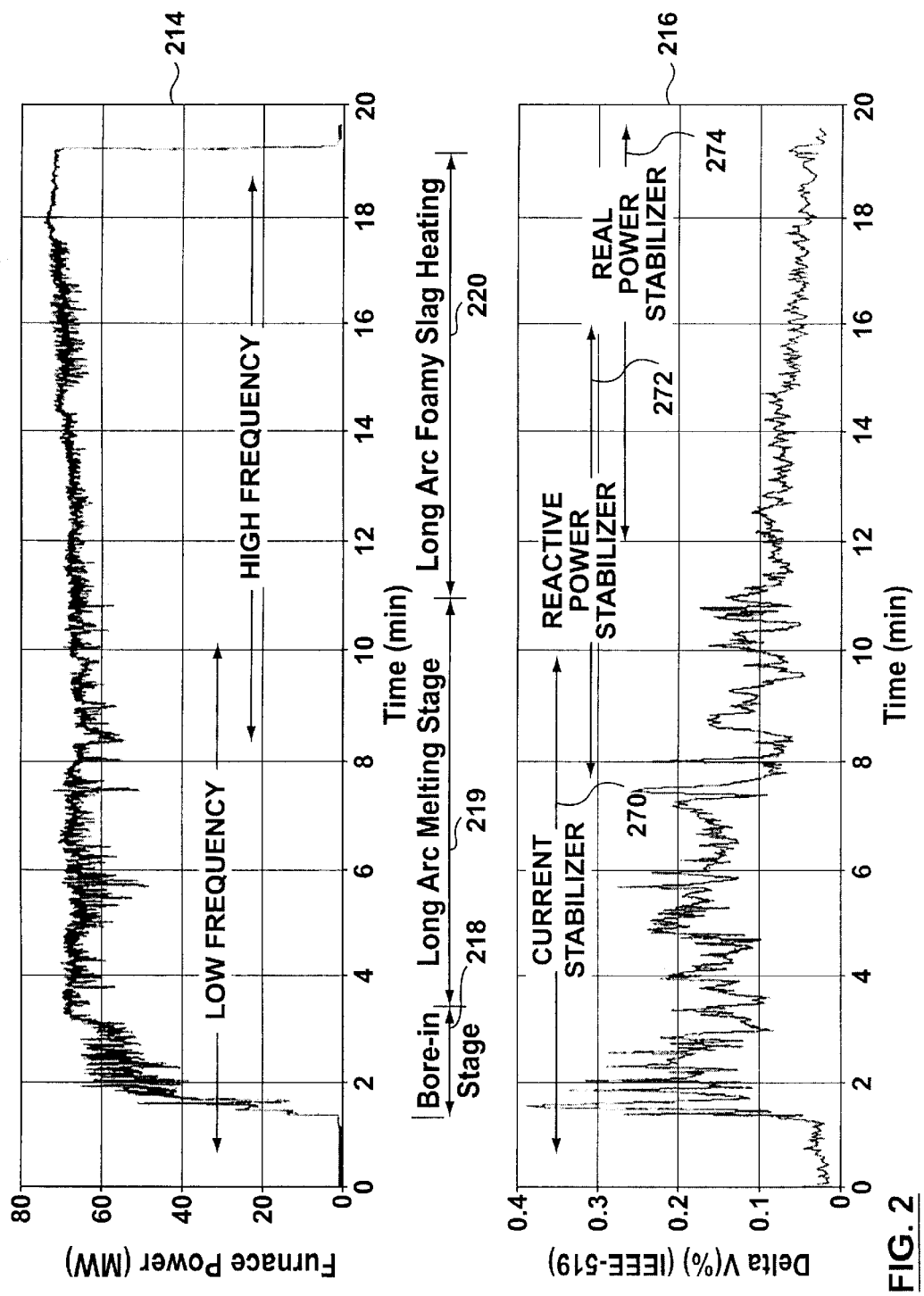
FIG. 2 shows representative graphs of power consumption and furnace voltage variation for a sample arc furnace melting process cycle.

For assistance in understanding the present invention, reference is made to FIG. 2 which includes a graph 214 showing an example power consumption profile for a sample arc furnace, and a graph 216 showing an example percent supply bus voltage variation profile for the sample arc furnace during a melting cycle. In particular, graph 214 shows a representative plot of furnace power (MW) versus time for a twenty minute "bucket melt", which includes the time from when the electrodes are first lowered to the work product for arc ignition, until the fully melted work product is ready to be emptied from the furnace vessel or another scrap bucket is charged to the furnace. Graph 216 shows a representative plot of the change in voltage variation during the twenty minute bucket melt as measured by a flicker meter which outputs the percent voltage fluctuation of the supply bus for the furnace. Based on the furnace power and supply voltage variation profiles, the arc furnace melting process cycle can be characterized as having three phases or stages which are indicated, in an approximate manner, on FIG. 2, including a "bore-in" stage 218 during which the arc furnace electrodes are lowered into the work product to be melted and arc ignition is effected, followed by a "long arc melting" stage 219 during which the work product is melted, finally followed by a "long arc foamy slag heating" stage 220 during which the work product is further melted and the resulting metal bath heated to a target temperature. The bore-in stage 218, which is accompanied by a large furnace power ramp-up is dominated by large, low frequency voltage fluctuations resulting from the unstable nature of the electrodes as the electrodes are first lowered into the scrap and lasting until electrode arcs have stabilized and the power ramp-up has been substantially completed. During such bore-in period relatively large voltage fluctuations may occur, for example, with a frequency of 0.1 to 7 Hz. The long arc melting stage 219 is dominated by a transition from large magnitude, low frequency fluctuations to voltage fluctuations of lower magnitude and higher frequency than during the bore-in stage, reflecting the more stable arcing that results once the work product begins melting. As the melting period progresses mid-range voltage fluctuations, for example mainly within a frequency range of 5–15 Hz, dominate. The long arc foamy slag heating stage 220 is dominated by lower magnitude, higher frequency voltage fluctuations, reflecting the relatively consistent arcing that exists once the work product has been melted into a foamy slag. During such foamy slag heating period, smaller voltage fluctuations may occur, for example, with a frequency of greater than 10 Hz.

Thus, there is a general progression in voltage flicker from low frequency large magnitude fluctuations early in the process cycle to higher frequency smaller voltage fluctuations later in the process cycle. Of course, the actual boundaries between the stages noted above are both furnace specific and load specific, depending on the furnace characteristics, and based on the work product make-up and grade.

Figure 3:
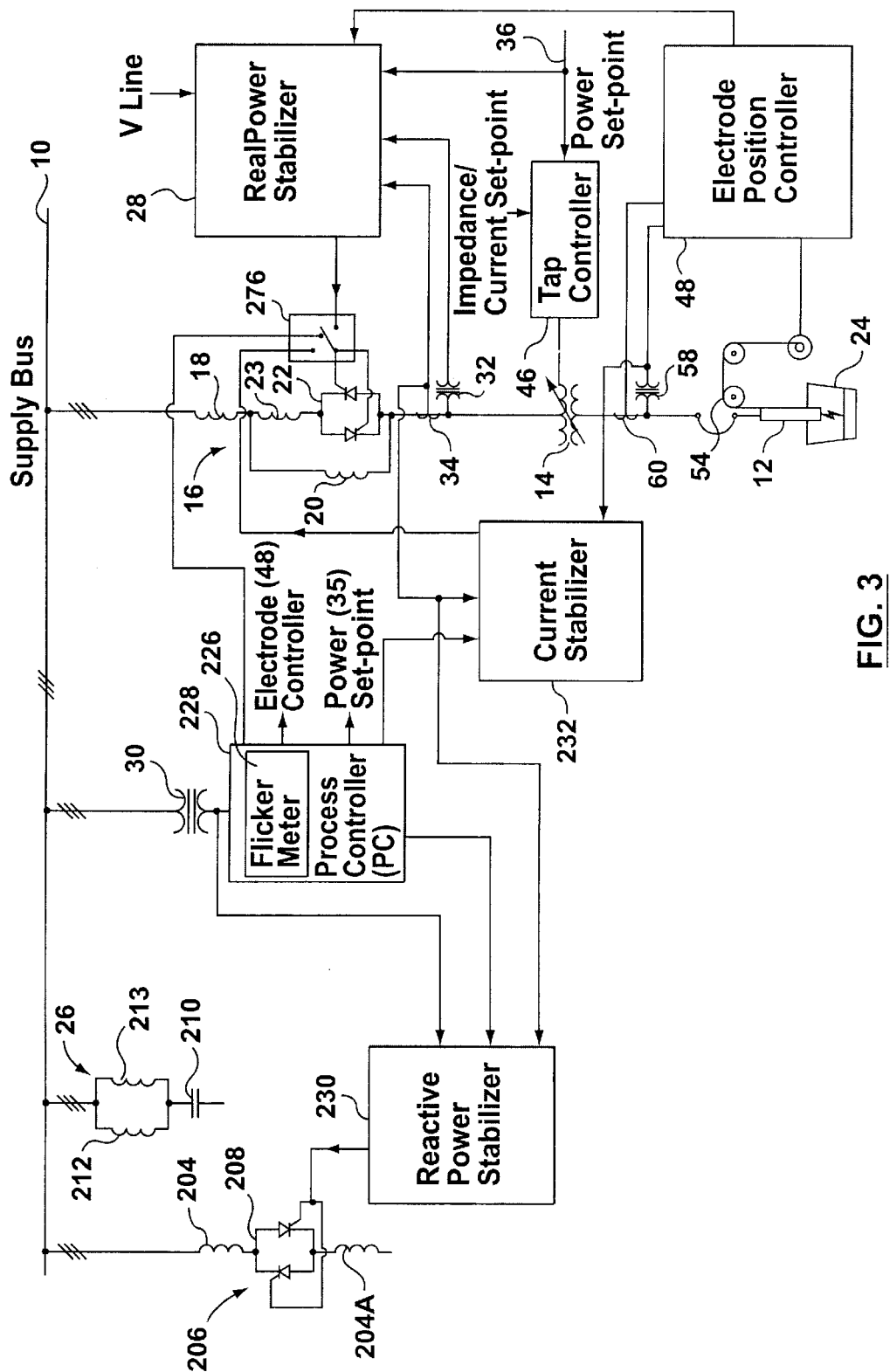
FIG. 3 is a simplified block and schematic diagram showing a power supply control system of the arc furnace of FIG. 1.

According to the present invention, a control system is used to control the operation of the inductive series reactor 202 and inductive shunt reactor 200 in order to control voltage flicker. Preferably, the control system controls the reactors 200 and 202 in a manner that is responsive to the changes in frequency and magnitude of the voltage flicker that occur during the different stages of arc furnace operation. With reference to FIG. 3, a power supply control system for the arc furnace 5 is shown. It will be appreciated that only a single phase and electrode 12 of the arc furnace 5 and its power supply are shown in the simplified drawing of FIG. 3. The same reference numbers are used to refer to like components throughout the Figures. The power supply control system, in a preferred embodiment, controls four elements in order to reduce voltage flicker and to reduce real power fluctuations, namely the value of the variable reactors 16 of the inductive series reactor 202; the value of the variable reactors 206 of the inductive shunt reactor 200; the tap locations of transformer 14, and the height adjustment of electrodes 12. In a preferred embodiment, the control system includes a process controller 228, a reactive power stabilizer 230, a current stabilizer 232, a real power stabilizer 28, a tap controller 46 and an electrode controller 48.

As will be explained in greater detail below, the process controller 228 coordinates the operation of the power supply control system components. The process controller 228 includes a flicker meter 226, which is connected through voltage transformers 30 to the supply bus 10 in order to monitor the per phase supply line voltages ($V_{L-G}$). The flicker meter 226 uses commonly known technology to output a signal that is representative of the magnitude and frequency of fluctuations in the supply line voltage. For example, the flicker meter 226 may output a signal or signals that conform(s) to the IEC 868 and/or IEEE519 standards. Each of these standards allow voltage fluctuations between 0.1 to about 15 fluctuations per second to be weighted, with the highest sensitivity being between 5 to 7 fluctuations per second. The process controller 228 further includes an industrial PC or other suitably configured logic device for automatically interpreting the output the flicker meter 226 and sending operative signals to coordinate the operation of the other components of the power supply control system as described below.

Figure 4:
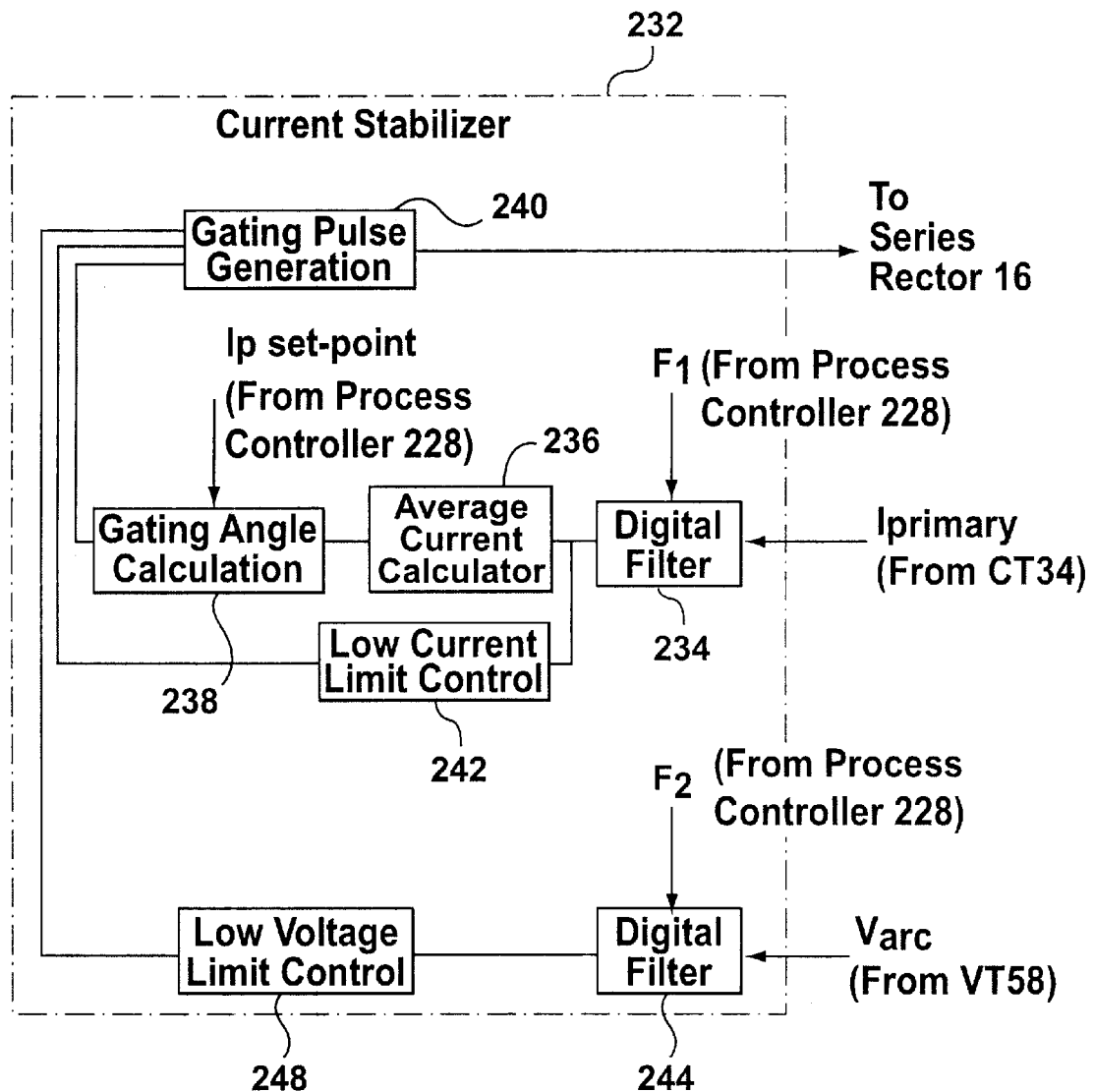
FIG. 4 is a simplified block diagram showing a current stabilizer of the power supply control system according to a preferred embodiment of the present invention.

According to a preferred embodiment of the invention, the current stabilizer 232 is provided to control voltage flicker primarily during the bore-in stage and into the long arc melting stage 219 of the furnace process cycle when large magnitude, low frequency voltage fluctuations are occurring. FIG. 2 shows an example time range 270 during which the current stabilizer 232 substantially contributes to voltage flicker reduction during the sample arc furnace process. In this regard, the current stabilizer 232 is configured to gate the thryristors 22 of the inductive series reactor in order to match the current draw of the furnace electrodes to a set-point value $I_{set-point}$ in order to maintain a relatively constant furnace load impedance during the period when large arc impedance swings are occurring. A simplified block diagram of the current stabilizer 232, according to one preferred embodiment of the invention, is shown in FIG. 4, the current stabilizer including a digitally tuned filter 234 that receives, as an input, signals $I_{primary}$ that are representative of the primary supply currents drawn by each phase of the arc furnace 5. As indicated in FIG. 3, current transformers (CT) 34 can be used to measure supply current for each phase of the arc furnace and generate the signals $I_{primary}$. The digitally tuned filter 234 receives tuning control signal $F_1$ from the process controller 228 such that the filter 234 allows only signals $I_{primary}$ falling within a bandwidth specified by the processor controller to pass through to an average current calculator 236 of the current stabilizer 232. Accordingly, the current stabilizer 232 can be tuned to respond to supply current fluctuations falling only within specified ranges, for example, the low frequency fluctuations that occur during the bore-in stage. Furthermore, the tuning can be varied throughout the arc furnace process cycle to focus the operation of the current stabilizer on different fluctuation ranges at different times during the process cycle.

The filtered signals $I_{primary}$ are used by the average current calculator to calculate an average supply current for each of the three phases over a predetermined time period (for example over a half or full AC cycle, i.e. 8 or 16.7 ms for a 60 Hz power supply). The averaged supply currents are provided to a gating angle calculation module 238 that determines what the thyristor firing angles for the inductive series reactor 202 should be to match a primary supply current set-point value $I_{p\text{-}set\text{-}point}$ that has been specified by the process controller 228. In a preferred embodiment, the module 238 performs its function by way of a look-up-table that has been predetermined based on the specific characteristics of the arc furnace 5. The current stabilizer 240 includes a gating pulse generation module 240 that receives the calculated thyristor angles from gating angle calculation module 238 and sends appropriate gating signals to the thyristors 22 of the series reactors 16.

In order to respond to loss of arc and aid in arc ignition, in a preferred embodiment the gating pulse generation module 240 is configured to receive override signals from both a low current limit control module 242 and a low voltage limit control module 248 which will cause the gating pulse generation module 240 to temporarily fully inhibit gating of the thyristors 22 in order to fully insert the reactors 20 in the event that either the primary supply current or the electrode arc voltage drop below predetermined thresholds. In the case of arc loss (indicated by low current), full insertion of the reactors 20 limits the peak currents when the electrodes lower to reestablish arcing. Low voltage indicates a short circuit, calling for full reactor 20 insertion. Thus, the low current limit control 242 monitors the filtered signals $I_{primary}$ to determine when an override signal should be provided. The low voltage limit control module 248 monitors arc electrode voltages for each phase through a further digitally tuned filter 244 in order to determine when an override signal should be provided by it to the gating pulse generation module 240. The digitally tuned filter 244, which receives tuning control signals F2 from the process controller 228, filters signals $V_{arc}$ that are representative of the per phase electrode voltages of the arc furnace. As indicated in FIG. 3, voltage transformers (VT) 58 can be used to measure the arc electrode voltage for each phase and provide representative signals $V_{arc}$.

With reference to FIG. 3, in a preferred embodiment the power supply control system includes a switch 276 that the process controller 228 operates to selectively connect either the current :stabilizer 232 or the real power stabilizer 28 to control the thyristors 22 of the induction services reaction 202. For example, the process controller 228 may be configured to switch the thyristors 22 to real power stabilizer control from current stabilizer control once the flicker meter 226 readings indicate that flicker has dropped below a predetermined threshold.

Broadly stated, the current stabilizer 232 is configured to respond to current fluctuations occurring within fluctuation ranges specified by the process controller 228 in order to match the current supplied to the furnace to a set-point supply current specified by the process controller 228. The current stabilizer may be implemented using a number of different configurations, for example, one or more suitably programmed industrial PCs, or other programable logic devices, could be used in combination with commercially available digitally tuned filters to implement current stabilizer 232. The current stabilizer could be implemented using suitable tunable filters in conjunction with known SPLC technology.

Figure 5:
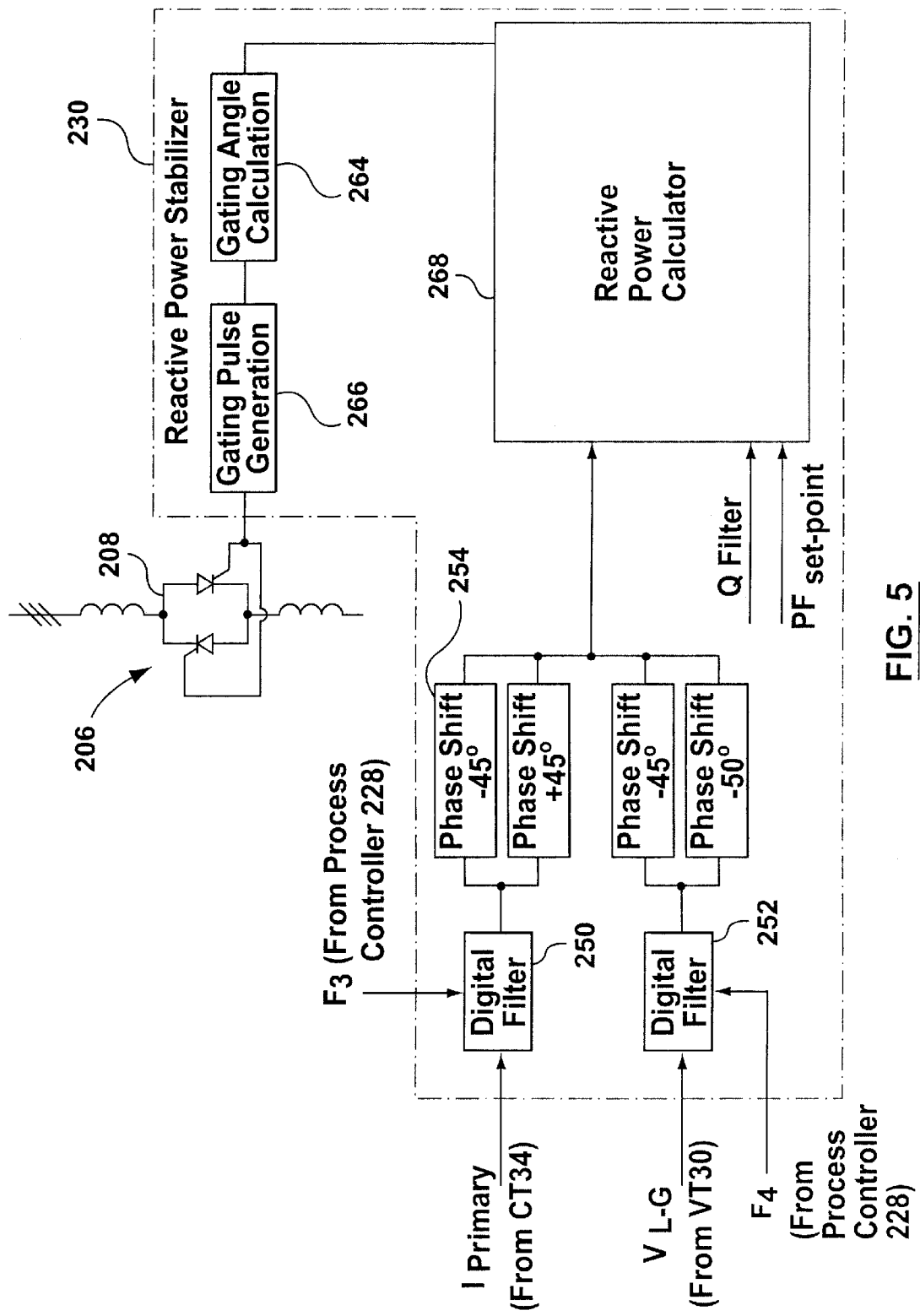
FIG. 5 is a simplified block diagram showing a reactive power stabilizer of the power supply control system according to a preferred embodiment of the present invention.

According to a preferred embodiment of the invention, the reactive power stabilizer 230 is provided to control voltage flicker primarily after the bore-in stage of the furnace process cycle, namely during portions of the long arc melting and long arc foamy slag heating stages, when lower magnitude, higher frequency voltage fluctuations dominate the process. FIG. 2 shows an example time range 272 during which the reactive power stabilizer 230 substantively contributes to voltage flicker reduction during the sample arc furnace process. In this regard, the reactive power stabilizer 230 is configured to gate the thryristors 208 of the inductive shunt reactor 200 in order to keep substantially constant and balanced at a low value (preferably close to zero) the total reactive power draw of the arc furnace (including series reactor 202), the harmonic filter bank 26, and the inductive shunt reactor 200. A simplified block diagram of the reactive power stabilizer 230, according to one embodiment of the invention, is shown in FIG. 5. The reactive power stabilizer includes a digitally tuned filter 250 that receives, as an input, signals $I_{primary}$ that are representative of the primary supply currents drawn by each phase of the arc furnace 5. As mentioned above, current transformers (CT) 34 can be used to measure supply current for each phase of the arc furnace and generate the signals $I_{primary}$. The digitally tuned filter 250 receives tuning control signal $F_3$ from the process controller 228 such that the filter 250 allows only signals $I_{primary}$ having fluctuations falling within a frequency bandwidth specified by the processor controller to pass through to a reactive power calculator 268 of the reactive power stabilizer 230.

The reactive power stabilizer 230 also includes a further digitally tuned filter 252 that receives, as an input, signals $V_{L\text{-}G}$ (from voltage transformers 30) that are representative of the supply voltages for each phase. The digitally tuned filter 252 receives a tuning control signal $F_4$ from the process controller 228 such that the filter 250 allows only signals $V_{L\text{-}G}$ having fluctuations falling within a frequency bandwidth specified by the process controller to pass through the reactive power calculator 268. Accordingly, the reactive power stabilizer 230 can be tuned to respond to supply current and voltage fluctuations (and hence reactive power variations) falling only within specified ranges, for example, the higher frequency fluctuations that occur after the bore-in stage. Furthermore, the tuning can be varied throughout the arc furnace process cycle to focus the operation of the reactive power stabilizer on different fluctuation ranges at different times during the process cycle.

A bank of +/−45 degree phase shifters 254 is interposed between the digital filters 250, 252 and reactive power calculator 268 for providing instantaneous samples representative of the per phase line voltages and per phase furnace supply currents. These samples are used by reactive power calculator 268, which also receives as inputs from the process controller 228 a desired set-point power factor $PF_{set\text{-}point}$ and a per phase reactive power $Q_{filter}$ for the harmonic filter bank 26. The per phase reactive power for the harmonic filter bank may be based on measured values. Using these inputs, the reactive power calculator determines, for each phase, a number that is representative of the error between the actual power factor and set point power factor. The calculated error value is proportional to the required gating angle for thyristors used by gating angle calculation module 264 which is configured to determine the appropriate firing angles for thyristors 208 in order to adjust shunt reactor 200 to result in an actual power factor that matches the set point power factor $PF_{set\text{-}point}$. The calculated gating angles are used by a gating pulse generation module 266, which generates the appropriate pulses to adjust the firing angles of thyristors 208. The reactive power stabilizer 230 acts to dynamically balance reactive power by the controlled summation of constant capacitive MVAR (provided by harmonic filter bank 26) and variable inductive MVAR.

Thus, with the exception of the presence of tunable filters 250 and 252, the reactive power stabilizer 230 is similar to the control systems used in conventional static var compensators (SVCs) known in the art, and can be implemented by using variable digital filters with known SVC technology. The reactive power stabilizer 230 may be implemented using a number of different configurations, for example, one or more suitably programmed industrial PCs, or other programable logic devices, could be used in combination with commercially available digitally tuned filters to implement current stabilizer 232.

Figure 6:
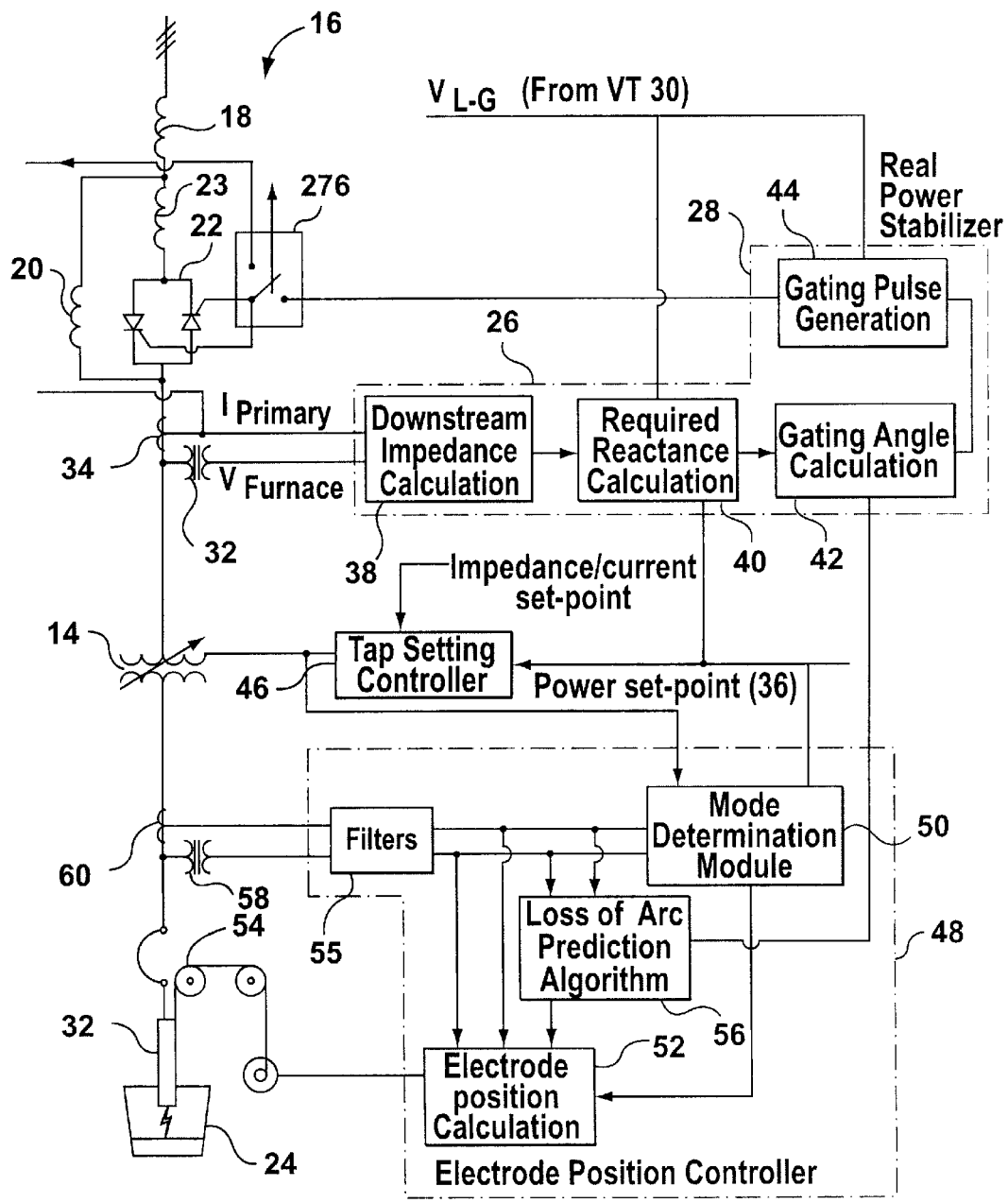
FIG. 6 is a simplified block diagram showing a real power stabilizer, tap setting controller and electrode position controller of the power supply control system according to a preferred embodiment of the present invention.

FIG. 6 is a simplified block diagram of a preferred embodiment of the real power stabilizer 28, electrode position controller 48 and tap setting controller 46. The tap setting controller 46 is configured to set the tap locations for the furnace transformer 14 based on a power set-point $P_{set-point}$ and a desired electrode current or electrode impedance set-point obtained from the process controller 228. In particular, the tap locations are set so that, based on predetermined characteristics of the arc furnace, an appropriate voltage will be provided to the electrodes to roughly match actual power consumption to the power set-point $P_{set\_point}$. In operation, the tap setting controller 46 preferably performs the following steps:(a) calculates a required operating voltage;(b) calculates an appropriate transformer voltage tap based on the predetermined (ie. nameplate) voltage values associated with each tap; and (c) moves the transformer tap to the calculated tap (either on-load or off-load).

In a preferred embodiment of the invention, the real power stabilizer 28 works in conjunction with the electrode position controller 48 to maintain a consistent active power (MW) draw by the arc furnace after the bore-in and long arc melting stages have occurred. FIG. 2 illustrates an example time range 274 during which the real power stabilizer 28 substantively contributes to real power regulation during the sample arc furnace process. The real power stabilizer 28 regulates the inductive series reactor 202 once the switch 276 has been switched to it by the process controller 228 so that the real power consumption by the arc furnace tracks the desired power set-point $P_{set-point}$ in the presence of arc impedance fluctuations. Preferably, the thyristor gating of the inductive series reactors 202 is periodically adjusted at least once during each AC line voltage half cycle when the real power stabilizer 28 is operating.

The real power stabilizer 28 includes a downstream impedance calculation module 38 for determining a per phase impedance downstream (i.e. on the furnace side) of the inductive series reactor 202 based on primary supply currents $I_{primary}$ measured for each of the three phases via current transformers 34, and furnace voltages $V_{furnace}$ that are measured for each of the three phases via voltage transformers 32 (which in the illustrated embodiment are located on the furnace side of series reactors 16). Based on these current and voltage measurements, the impedance calculation module 38 determines the per phase resistance (RL) and reactance (XL) at the furnace side of the variable reactors 16, and outputs these values to a required reactance calculation module 40. Variations in the furnace side resistance (RL) and reactance (XL) are indicative of the variations in electrode impedance that occur during the furnace melting process cycle. The reactance calculation module 40 also receives as inputs signals from voltage transformers 30 that are representative of the per phase supply voltages ($V_{L-G}$), and from the process controller 228 the desired per phase power set-point ($P_{set-point}$). The reactance calculation module 40 determines, based on these inputs, a required reactance (XREQ) value for each phase that the variable reactors 16 should assume in order for the actual furnace power to track the desired furnace power set-point.

The real power stabilizer 28 also includes a gating angle calculation module 42 which receives three inputs per phase, namely the required reactance (XREQ) as calculated by the reactance module 40, and the reactance (XL) and resistance (RL) at the furnace side of the variable reactor 16 as determined by the downstream impedance calculation module 38. Based on these inputs, the angle calculation module 42 determines the appropriate firing angles per phase for thyristors 22 required to achieve the calculated required reactance. In a preferred embodiment, the module 42 determines the firing angles by accessing a stored look-up table that has been predetermined in accordance with the unique characteristics of the subject arc furnace. In the illustrated embodiment, the look-up table values can be predetermined by performing the following steps:

a) Determine possible values for the furnace side reactance (XL) and resistance (RL), in predetermined increments;

b) Based on design values for the shunt inductor 20 and the system line voltage, calculate a steady-state load current waveform for each thyristor gating angle between 0 to 180 degrees, for each of the possible values for the furnace side reactance (XL) and resistance (RL);

c) For each steady-state load current, calculate the current fundamental frequency component, and calculate the total fundamental reactance by taking the ratio of system line voltage to the fundamental current;

d) For each calculated total fundamental reactance, determine a required reactance value (XREQ) of the variable reactor by subtracting the furnace side reactance (XL) from the total fundamental reactance; and e) Tabulate the results such that the required gating angle can be determined for each possible combination of required reactance values (XREQ), furnace side reactance (XL) and furnace side resistance (RL).

It will be appreciated that the gating angles could be calculated at the gating angle calculation module 42 using methods other than referencing a predetermined look-up table, however given the compute intensive and repetitive nature of the gating angle calculations, a look-up table offers a reasonably efficient solution. Additionally, other methods could be used for calculating the values that are to be included in the look-up table, and other variables could be taken into consideration depending on the specific configuration of the subject arc furnace.

The real power stabilizer 28 also includes a gating pulse generation module 44 which receives as inputs the gating angles as determined by the angle calculation module 42, and the line voltage signals $V_{L-G}$ from voltage transformers 30. The pulse generating module 44 includes a pulse gate generator that adjusts the gating angles of thyristors 22 to match the per phase gating angles determined by the angle calculation module 42. In the illustrated embodiment, the pulse generating module is configured to update the thyristor angles every half AC voltage cycle, and in this respect includes a zero-crossing detector that monitors the line voltage via voltage transformer 30 in order to control the timing of thyristor angle updates. Similarly, in this embodiment the required reactance calculation module 40 determines, during operation of the real power stabilizer 28, a required reactance value for each phase at least every half AC line voltage cycle to ensure that the gating angle provided to the pulse generation module 44 is current.

Depending on furnace specific characteristics, the real power stabilizer could be configured to adjust the firing angles with greater or less frequency than once per half cycle, although typically adjustments at least once per power cycle are desirable in order to sufficiently stabilize arc power.

As will be explained in greater detail below, the real power stabilizer 28 is preferably configured to accept an override signal causing it to turn fully on the appropriate thyristor pair 22 when the power supply control system detects that loss of a corresponding electrode arc is impending. In the illustrated embodiment, the gating angle calculation module 42 is configured to output, for a predetermined interval, a near zero gating angle instruction to the gating pulse generation module 44 when the gating angle calculation receives an override signal from a loss of arc prediction module 56. The override signal from the loss of arc prediction module 56 takes precedence over any inputs that the gating angle calculation module 42 receives from the required reactance calculation module 40.

The modules 38, 40 and 42 of the real power stablizer 28 can conveniently be implemented using a suitably programmed industrial PC, however it will be understood by those skilled in the art that the functionality of such modules could be implemented using a number of different possible hardware and/or software configurations. The gating pulse generation module 44 can conveniently be implemented using a suitable programmed FPGA device, however other implementations could be used such as micropresssor or dedicated circuit based devices.

The presence of the fixed reactor 18 in series with the variable reactor 16 in each phase helps maintain the average furnace power factor within a specific range as measured at the voltage supply bus, especially in a situation where the reactance 20 is completely shorted. With the fixed reactor 18 in place, a variation in arc resistance can be compensated for by the changing the reactance of the variable reactor 16 by a magnitude that is equal to or less than that of the arc resistance variation. Under these conditions, the resulting reactive power draw from the supply bus is minimized. The inductor 23, which is optional, serves to protect the thyristor pair 22 from damaging short circuit currents.

Turning now to regulation of the electrode positions, the power supply control system includes an electrode position controller 48 for regulating an electrode movement system 54 to adjust the height of the electrodes 12 relative to the furnace vessel 24. As will be described in greater detail below, the electrode position controller 48 is configured to monitor on an on going basis various furnace operating conditions, such as electrode voltages, electrode currents, power consumption, and electrode movements. The monitored process variables, and changes in the monitored process variables, are compared against stored values and variation patterns that have been predetermined to be indicative of a number of different types of furnace upset conditions. Based on characteristic signatures in the variations of the furnace process variables, the position controller predicts the onset of one of a number of different possible furnace upset conditions, and regulates the electrode height in a mode that is appropriate for the specific upset condition. Through upset condition specific regulation, the electrode position controller attempts to reduce power swings while also maintaining process energy efficiency, furnace roof structural integrity and power system electrical balance. In the embodiment shown in FIGS. 3 and 6, the electrode movement system 54 is illustrated as a winch-driven system, however other systems capable of raising and lowering the electrodes 12, such as hydraulic cylinder driven systems, could alternatively be used.

The electrode position controller 48 preferably is under the control of a mode determination module 50 that continuously monitors the operating characteristics of the furnace and picks one of a number of different possible operating modes for electrode height regulation based on the measured characteristics. Although the mode determination module 50 is shown in FIG. 6 as being part of the electrode position controller, it could be located at and part of process controller 228. In order to measure furnace conditions, the mode determination module 50 receives inputs from current transformers (CT) 60 (a CT 60 being used for each of the three phases), which measures electrode current, and voltage transformers (VT) 58 (a VT 58 being used for each of the three phases), which measures electrode voltage to neutral. Filters 55 may be used to filter the inputs from CT60 and VT58 so that the electrode position controller can filter out current and voltage variances that are caused by low frequency mechanical resonance. Such filtering can help avoid flicker amplification from occurring at an inherent resonant frequency of the electrode regulator mechanical system. The mode determination module 50 also monitors additional operating characteristics, including the furnace roof temperature via signals received from a temperature sensing element such as a thermocouple (not shown), furnace noise (including audible and some inaudible frequencies) and via signals received from an acoustic transducer (not shown), electrode movement via feedback from an electrode position calculation module 52, the desired power set-point via line 36, and the furnace tap setting via an input from the tap setting controller 46. The mode determination module 50 is configured to select from among a VOLTAGE mode, an IMPEDANCE mode and a CURRENT mode of operation.

In a preferred embodiment, the mode determination module selects a default mode of VOLTAGE mode when the current stabilizer 228 is active (i.e., when switch 276 is set to the current stabilizer 232). When VOLTAGE mode is not the default mode, the mode determination module 50 will temporarily select VOLTAGE mode when the onset of an open arc situation (for example, when one or more electrode tips are positioned unshielded above the work material) is detected in order to protect the furnace roof from excessive arc radiation. The mode determination module 50 monitors a number of variables in order to determine if an open arc situation has occurred or is likely to occur, including but not necessarily limited to: (a) changes in electrode power factor; (b) increases in standard deviation of electrode power; (c) higher incidences of loss of arc for the electrode; (d) higher audible furnace noise; (e) changes in the arc current and voltage harmonic profiles; (f) increase in furnace roof heat flux immediately surrounding the electrode opening; and (g) recent electrode movements such as raise and lower hunting of the electrode. The mode determination module 50 compares the ongoing monitored values of these variables against stored thresholds and patterns that have been predetermined to be indicative of the onset of an open arc situation in the subject arc furnace.

When in VOLTAGE mode, the mode determination module 50 determines a voltage mode control error (Control Error) equation that it provides to the electrode position calculation module 52 to control movement of the electrodes 12, typically in a downward direction to eliminate the open arc condition. In a preferred embodiment, the voltage mode Control Error equation is as follows:

$$\text{Control Error} = kI^*I - kV^*V \qquad \text{Equation (1)}$$

where:

V is the electrode to neutral voltage as measured through transformer 58;

kI and kV are current and voltage scaling constants that are pre-calculated and stored in a look-up table. They are indexed in the look up table according to the transformer tap position; and I is a predetermined constant that approximates what a normal operating electrode current for the subject arc furnace is.

In VOLTAGE mode, the Control Error equation is applied in respect of all three electrodes 12 using the voltage that is measured for each respective electrode. By using a predetermined current constant for I, rather than a measured electrode current value, to determine the control error the electrode position controller focuses on quickly stabilizing arc voltage through electrode height regulation.

IMPEDANCE mode is typically used when the furnace arcing has stabilized, and thus in a preferred embodiment, the mode determination module selects a default mode of IMPEDANCE mode when the real power stabilizer 28 is actively controlling the inductive series reactor 202. Thus, the electrode position controller 48 is toggled from a default VOLTAGE mode to a default IMPEDANCE mode when the process controller 228 detects that voltage flicker has dropped below a threshold value. In IMPEDANCE mode, the mechanical movement of each electrode 12 is decoupled from that of the other electrodes in the three electrode system of the present embodiment. Each individual electrode 12 is moved when its measured impedance value changes by a predetermined amount from a set-point impedance value until a match between the measured value and the set-point value is restored within a predetermined tolerance. Thus, for each electrode, the mode determination module 50 determines the ongoing electrode impedance (through the measured electrode voltage and current values), and if the measured impedance does not match the set-point impedance (ie. if an upset condition exists for that electrode), the mode determination module 50 calculates an impedance mode Control Error equation that it provides to the electrode position calculation module to control electrode movement. Preferably, the impedance set-point value is the ratio of the gain constants kI/kV, and the impedance mode Control Error equation is as follows:

$$\text{Control Error} = kI*I - kV*V \qquad \text{Equation (2)}$$

where:

V is the electrode to neutral voltage as measured through transformer 58;

kI and kV are the gain constants mentioned above; and

I is the electrode current as measured through transformer 60.

In IMPEDANCE mode, the individual adjustment of electrodes whose process impedance has changed from a set-point impedance value reduces the disturbance of the charge cover over the arc. It will be appreciated that rather than being measured by secondary side transformers 58, 60, values for V and I could be derived from measurements taken from primary side transformers 32 and 34, respectively, by adjusting such primary side measurements in accordance with the appropriate furnace transformer turns ratio.

In some embodiments, the mode determination module 50 can also temporarily select a CURRENT mode when the furnace operating conditions indicate a high degree of electrical unbalance (which, if left unanswered can cause a protective relay to trip the furnace power off). In CURRENT mode, the electrode position controller 48 operates to move the electrodes to restore balanced electrode currents, which minimizes the possibility of an unbalanced furnace trip. The mode determination module 50 monitors the current balance by measuring the component of negative sequence current in the primary or secondary phase currents of the furnace transformer 14. In the illustrated example, the secondary phase currents are measured through current transformers 60, and the mode determination module 50 performs symmetrical component decomposition. An exemplary decomposition equation is illustrated as follows:

$$I2 = 1/3(Ia + a^2 Ib + aIc)$$

Where:

a = −0.5 + j0.866;

I2 = negative sequence current;

Ia = phase a current vector;

Ib = phase b current vector; and

Ic = phase c current vector.

When the value of negative sequence current is maintained for a predetermined time above a threshold level, CURRENT mode is selected. When the current balance condition upset is rectified, IMPEDANCE mode is restored. Upon selecting CURRENT mode, the mode determination module 50 determines a current mode control error equation that it provides to the electrode position calculation module 52 to control movement of the electrodes 12 to reduce the current imbalance. In a preferred embodiment, the CURRENT mode Control Error equation is as follows:

$$\text{Control Error} = kI*I - kV*V \qquad \text{Equation (3)}$$

where:

I is the electrode current as measured through transformer 60;

kI and kV are current and voltage scaling constants as noted above; and

V is a predetermined constant that approximates what a normal operating electrode voltage for the subject arc furnace is.

In CURRENT mode, the Control Error equation is applied in respect of all three electrodes 12 using the current that is measured for each respective electrode. By using a predetermined voltage constant V, rather than a measured voltage value, to determine the control error the electrode position controller focuses on quickly balancing electrode currents through electrode height regulation. It will be appreciated that the current mode Control Error equation (5) and voltage mode Control Error equation (3) are the same as impedance mode Control Error equation (4), with the replacement of measured voltage V with a constant in the case of the current mode equation, and the replacement of measured current I with a constant in the case of the voltage mode equation.

The coupling of electrode voltages and currents between the phases is inherent in a three electrode arc furnace. Thus, in the three electrode furnace of the present embodiment, when an arc disturbance occurs under one electrode, the voltages and currents of all three electrodes are affected. Hence, in CURRENT and VOLTAGE mode, movement of all three electrodes occurs to counter an upset condition. In IMPEDANCE mode, however, in a preferred embodiment only the electrode whose impedance needs adjusting is moved, which minimizes disturbance of the arc cover.

The electrode position controller 48 includes an electrode position calculation module 52 that is configured to control the electrode movement system 54 to raise or lower electrodes 12 in accordance with instructions received from the mode determination module 50. The calculation module 52 also monitors electrode position for its own use and to provide feedback about electrode location and movement to the mode determination module 50. As indicated above, in CURRENT and VOLTAGE mode, the three electrodes are moved to restore current and voltage, respectively, to setpoint values. In IMPEDANCE mode, movement is individually imparted to the electrodes to restore their respective impedances to correct levels. The calculation module 52 receives electrode current information and electrode voltage information from current transformer 60 and voltage transformer 58, respectively.

During furnace operation, the position calculation module 52 receives the appropriate Control Error equation selection from the mode determination module 50 and uses it to control electrode movement as follows. The Control Error is raised to the exponent n, where alpha<n<beta (where alpha is usually=1, and beta is usually=2), and continuously integrated by an integrator. When the integral limit is reached, the electrode start speed is set to a value proportional to the average error over the integration period. The electrode speed is then made proportional to the instantaneous error until the error falls within a predetermined deadband. The integrator is then re-set, and integration starts when the electrode stops moving. In the event that the Control Error is higher than a pre-set threshold, the integration step is bypassed, and the electrode is moved at a high speed or at maximum speed until either (a) the error falls within the predetermined deadband, or (b) the error falls below the pre-set threshold and the speed is then adjusted to be proportional to the instantaneous error. Generally, electrode movement speeds in the present embodiment of the invention would fall between 300 mm/minute to 20,000 mm/minute. It will be appreciated that in addition to the presently described method, a number of different known movement control algorithms could be used by the electrode position calculation module 52 to control electrode movement.

The electrode position calculation module 52 is that it includes an arc length override function whereby it determines the electrode arc length for each electrode prior to moving it, and continuously monitors electrode travel while moving the electrodes. If an electrode travels past its calculated arc length, an override command is issued to reduce the electrode speed to creep speed to minimize electrode breakage or an undesirable metallurgical reaction in the slag bath of the furnace (which can result from a reaction between the carbon in the electrode and the molten bath within the furnace). In the present embodiment, the arc length for each electrode is calculated as follows:

$$\text{Arc Length} = (V - I \cdot RsIaq - Vo)/Eo$$

Where:
   V is the electrode to neutral voltage;
   I is electrode current;
   RsIaq is the resistance of the electrode when the tip just contacts the hot bath surface;
   Vo is a constant representing a voltage drop; and
   Eo is a constant which represents the arc electric field in volts/cm.

In practice, the arc length calculation could be dependent on other furnace operating variables in addition to those shown above. In the present embodiment, the Control Error is integrated every half power cycle, based on furnace operating characteristics measured every half cycle. However, less frequent integration and sampling intervals could be used by the electrode height regulator of the present invention.

The electrode position controller 48 also includes a further override function that is implemented by the loss of arc prediction algorithm module 56, which predicts yet a further type of upset condition. This module predicts the loss of arc in any of the electrodes 12, by monitoring for the onset of a characteristic rapid decay of arc current, and responds by (a) instructing the electrode position calculation module 52 to rapidly lower the electrode 12 for which loss of arc is predicted, and (b) as noted above, sending an override signal to the reactor controller 28 that results in full turning on of the thyristor switch 22 (ie. providing a gating angle of nearly zero) that is associated with the electrode 12 for which loss of arc is predicted, thus completely shunting the respective inductor 20, which provides an instantaneous voltage boost to the affected electrode. The increase in the electrode tip voltage caused by having the thyristor switch fully on and the reduction in arc length due to lowered electrodes will increase the electric field under the electrode. As a result the level of ionization in the arc column will be restored and a loss of arc is prevented (or the arc restored in the event that loss of arc has actually occurred). Once the arc column is restored the override control of the reactor controller 28 by loss of arc prediction module 50 will be terminated, thus permitting the reactor controller 28 to detect the resulting reduced arc impedance and accordingly increase the reactance of variable reactor 16 by increasing the thyristor gating angle. As a result, the electrode power will not be allowed to exceed the power set point value. The traditional consequence of a fast electrode lower has been a rapid positive current and/or power swing which can result in a circuit breaker trip on smelting furnaces. On steel furnaces, a fast lower can cause electrode tip breakage and/or a circuit breaker trip. Thus, rapid electrode lowers have traditionally been avoided. However, the control of variable reactors 16 in conjunction with the electrode lowering mitigates the positive power swing, thereby reducing the possibility of a power outage due to a breaker trip. Furthermore, the arc length override function (which continues to run even during a loss of arc override) reduces the chance of furnace delay due to an electrode tip breakage.

The operation of the loss of arc prediction algorithm module 56 is illustrated by the following pseudo-code:
(i) DO WHILE the furnace is operating
   (ii) Continuously sample each electrode current;
      (iii) IF the rate of change of decreasing current is greater than a preset limit,
         AND IF the electrode current is less than k x (the set point value)
            (iv) THEN initiate a master lower at full speed and gate thyristors;
            (v) IF the electrode current is restored to set point value OR IF the electrode voltage is zero
            (vi) THEN restore electrode regulation to mode determination module 50 and thyristor regulation to reactor controller 28;
(vii) END DO;

As indicated in steps (i) and (ii) of the pseudo-code, while the arc furnace is operating, the loss of arc prediction algorithm module 56 monitors each electrode current via the current transformers 60 that are associated with each electrode. As indicated in step (iii), if the current is decreasing, its rate of change is checked to see if it exceeds a predetermined threshold value. The predetermined threshold is chosen based on the characteristics of the subject furnace, and in particular is chosen to be a value that is known to be indicative of impending loss of arc. In step (iii), the electrode current is also checked to see if it is less than a predetermined percentage of a current set-point. (The current set-point being determined based on the power set-point and transformer voltage tap setting.) If the two test conditions in step (iii) exist, the module 56 concludes, as per step (iv), that the furnace operating conditions are predictive of an impeding loss of arc and takes steps to avoid loss of arc by instructing the electrode position calculation module 52 to lower the electrodes, and the reactor controller 28 to fully turn on thyristors 22. As indicated in step (v) these arc loss avoidance measures are maintained until (a) the subject electrode current is restored to set-point value (which is indicative of a loss of arc being prevented, or an arc being restored in the event that loss of arc did occur), or (b) the electrode voltage goes to zero (which is indicative of the electrode tip touching the molten bath in the furnace vessel). After step (v) the loss of arc prediction module 56 releases control of electrode regulation back to the mode determination module 50, and control of the variable reactors 16 back to the reactor controller 28, as per step (vi), which will generally result in some raising of the electrodes and an increase in variable reactance 16, thus mitigating any positive power swing that could occur on arc re-ignition.

The electrode position controller 28 can conveniently be implemented using a suitably programmed industrial PC, however it will be understood by those skilled in the art that the functionality of its modules could be implemented using a number of different possible hardware and/or software configurations. The tap setting controller 46 could also be implemented using an industrial PC or suitable alternative, and could be implemented using the same PC as is used for the electrode position controller 48.

The variable reactor control provided by the real power stabilizer 28 during the time duration 274 after the process has settled down and electrode regulation of the present invention assists in providing the arc furnace to which they are applied with a flat line power profile without substantial positive or negative power fluctuations. Thus, in a preferred embodiment of the invention, the current stabilizer 232 controls the inductive reactor 202 early in the bucket melt cycle in order to control voltage flicker. Once the work product has been fully melted and flicker drops below a threshold, then the real power stabilizer 28 takes over control of the inductive series reactor 202 in order to mitigate any fluctuations in real power, thus increasingly the efficiency of the process.

An overview of the components of the power supply system having been provided, an example of the operation of the power supply system in the context of a steel arc furnace bucket heat will now be discussed in accordance with preferred embodiments of the invention, with reference to the Figures. At the start of and throughout, a bucket heat the process controller 228 continuously monitors flicker on the supply bus 10 through the flicker meter 226 and responds by coordinating the operation of the reactive power stabilizer 230, the current stabilizer 232, electrode position controller 48, tap controller 46 and real power stabilizer 36 to mitigate flicker. Prior to the commencement of the melting process the process controller performs initial tuning of the current filter 234 and voltage filter 244 of the current stabilizer 232, and the current filter 250 and voltage filter 252 of the reactive stabilizer 230, provides the power factor set-point $PF_{set-point}$ to the reactive power stabilizer 230, the current set-point $I_{p-set-point}$ to the current stabilizer and provides the power set-point $P_{set-point}$ to each of the real power stabilizer 28, tap setting controller 46 and electrode position controller 48.

At the start of the bore-in stage, the power set-point $P_{set-point}$ will typically be set to some mid-range percentage of a predetermined maximum furnace power (which may be contractually set between the furnace operator and the power supply network owner), for example, say 50% of the maximum power limit. Throughout bore-in the power set-point will be ramped up to, or close to, the maximum power limit, as can be observed in the sample furnace power plot 214 of FIG. 3. After bore-in, the power set-point will be maintained at or near the maximum power limit. The current set-point $I_{set-point}$ and tap set point are determined based on the power set-point and other criteria, for example arc length. In a steel arc furnace, voltage flicker emissions are directly related to the aggressiveness of the power ramp, and accordingly the greater the attenuation of the flicker, the more aggressive the power ramp can be, thus improving furnace performance.

At the start of the bore-in the power factor set point $PF_{set-point}$ will typically be set to correspond to a utility metering point power factor of less than unity, for example 0.95 to 0.98. After bore-in, the power factor set point will typically be raised to correspond to a utility metering point power factor closer to or at unity.

Figure 7:
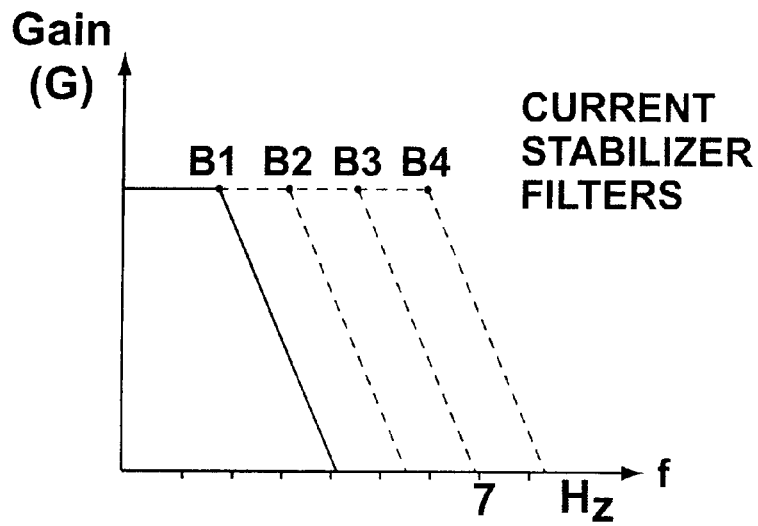
FIG. 7 is a plot of filter gain v. frequency for the filters of the current stabilizer according to exemplary embodiments of the present invention.

At the start of bore-in, the switch 276 will be positioned such that the current stabilizer 232, rather than real power stabilizer 28, controls the thyristors 22 of inductive series reactor 202. The current stabilizer current and voltage filters 234, 244, may, in an exemplary embodiment, be configured as low pass filters having a gain profile such as shown in FIG. 7 with a low frequency breakpoint B1. The reactive power stabilizer current and voltage filters 250, 252 may, in an exemplary embodiment, be configured as band pass filters having a gain profile such as shown in FIG. 7 with breakpoints RB1 and RB1'. With such a filter configuration, the low frequency, high magnitude flicker fluctuations that tend to occur during bore-in and into the long arc melting stage will primarily be compensated for through adjustment of the inductive series reactor 202 by current stabilizer 232 in order to match the furnace supply current to the current set-point. The higher frequency, lower magnitude flicker fluctuations that tend to dominate the bucket heat process latter in the long arc meting stage and into the long arc foamy slag heating stage will primarily be compensated for through control of the inductive shunt reactor by the reactive power stabilizer 230 in order to adjust the the summed reactive power draw of harmonic filter bank 26, inductive shunt reactor 200 and the arc furnace to track the power factor set-point.

Figure 8:
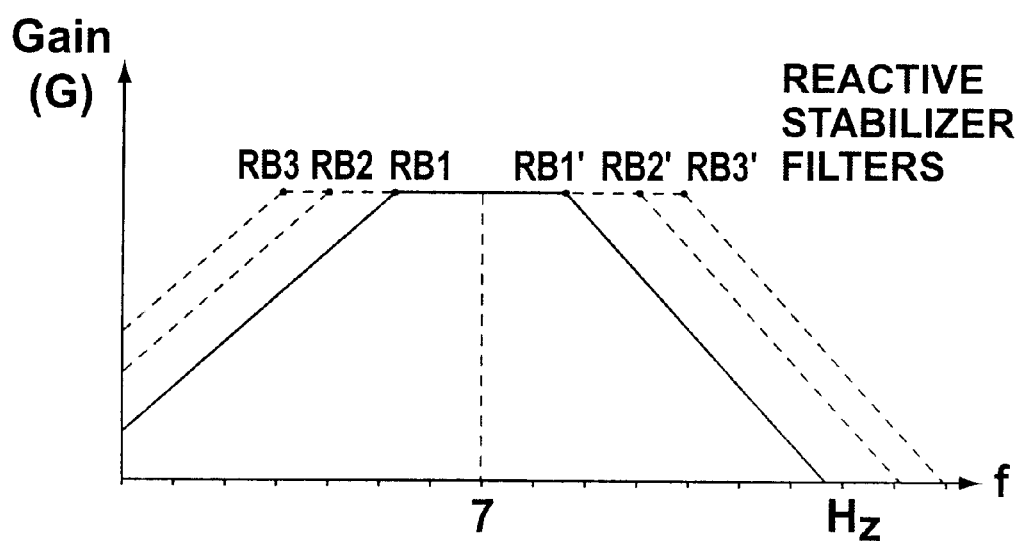
FIG. 8 is a plot of filter gain v. frequency for the filters of the reactive stabilizer according to exemplary embodiments of the present invention.

Accordingly, as a result of the filtering noted above, in one exemplary embodiment, the current stabilizer dominates flicker reduction during the early stages of the bucket melt (as indicated by representative line 270 in FIG. 2) and the reactive power stabilizer dominates flicker reduction during the mid-stages of the bucket melt (as indicated by representative line 272). Such a configuration is used in a preferred embodiment of the invention as varying the inductive series reactor 202 is more effective at reducing low frequency voltage flicker by stabilizing impedance during large arc impedance swings, whereas varying the shunt series reactor 200 is more effective at reducing higher frequency voltage flicker (for example, flicker centered around 7 Hz) by balancing reactive power consumption. As represented in FIG. 2, there may be durations during which both the current stabilizer 232 and reactive power stabilizer 230 are both substantively contributing to flicker reduction, each being focused on mitigating flicker within different frequency ranges. As represented in FIGS. 7 and 8, the different frequency ranges addressed by the current stabilizer and reactive power stabilizer can overlap as well. Depending on the specific application, in some embodiments, the time and frequency overlaps may be extensive, and it other embodiments the overlaps may be minimal.

During the bucket melt, the flicker meter 226 continuously monitors voltage flicker on the supply bus. As noted above once the flicker drops below a threshold value, the process controller 228 will toggle control of the inductive series reactor 202 from the current stabilizer 232 to real power stabilizer 28, which then functions to stabilize the active furnace power by adjusting the variable inductive reactors 16 every AC power cycle or half cycle. Thus, once voltage flicker has been confined to within predetermined limits the focus of the inductive series reactor 202 becomes power flat lining, rather than flicker reduction, as represented by the line 274 in FIG. 2. Depending on the specific application, in some embodiments the process controller may toggle back and forth between the current stabilizer 232 and the real power stabilizer 274 as the monitored flicker condition changes. For example, large amplitude, low frequency flicker may occur during arc extinction which could justify current stabilizer control. The toggling threshold may be a hysteresis or range, in that the flicker threshold for switching from current stabilizer to real power stabilizer control may be lower than the flicker threshold for switching back from real power stabilizer control to current stabilizer control. The threshold may also be based on an averaged value. The use of real power stabilizer helps to improve furnace efficiency by stabilizing real power consumption, thereby allowing actual furnace consumption to more closely match target furnace consumption, as measured over a production period.

During a steel arc furnace bucket melt, the electrode position controller 48 will generally run in a default VOLTAGE mode early in the process when large electrode impedance fluctuations are occurring, and will shift to a default IMPEDANCE mode later in the process when such fluctuations level off. Conveniently, the threshold for switching between default VOLTAGE and default IMPEDANCE mode may be the same as that used for switching from current stabilizer to real power stabilizer control.

As noted above, in a preferred embodiment of the invention, the filters 234, 244, 250, and 252 are tunable such that their respective filtering patterns (gain, bandwidth, and/or center frequencies) can be adjusted by the process controller 228 throughout the process cycle in response to changing dynamics in the measured voltage flicker. This permits the process controller 228 to adjust the tunable filters in order to maximize the attenuation of dominant flicker frequencies. In the regard, the flicker meter preferably outputs throughout the process an on-going and time dependent indication of the flicker intensity at each of a number of different frequencies and this information is used by the process controller to select at which frequencies dominating flicker is occurring, and adjust the filters 234, 244 of the current stabilizer 232 and/or the filters 250,252 of the reactive power stabilizer 230 to focus on and/or ignore such dominant flicker frequencies. For example, with reference to FIGS. 7 and 8, early in the bore-in stage of a bucket heat, the process controller 228 may detect a dominant flicker frequency at less that 1 Hz, and accordingly adjust the current stabilizer filters 234,244 to have relatively low breakpoint B1 in order to focus the current stabilizer on mitigating that dominant flicker frequency. Simultaneously, the process controller may adjust the reactive power stabilizer filters 250,252 to have narrow breakpoints RB1, RB1' centered around 7 Hz in order to avoid power stabilizer reaction to the low (below 1 Hz) dominant flicker frequency, and instead focus on flicker frequency around 7 Hz. As the bucket heat process progresses, flicker that occurs at the lower frequency ranges may be more evenly distributed over the lower frequency ranges, and in response the process controller may progressively move the breakpoints of current stabilizer filters 234, 244 out (for example to B1 then B3 then B4), thus broadening the range of frequencies to which the current stabilizer responds. Similarly, the process controller 228 can adjust the breakpoints of reactive power stabilizer filters 250,252 from (RB1, RB1') to (RB2,RB2') and then (RB3,RB3') if the flicker meter indicates that the higher frequency flicker is spread out over the higher frequencies, and alternatively can narrow the bandwidth to concentrate more on selected frequencies when the flicker meter data indicates that a dominate flicker frequency exists. Typically, the reactive power stabilizer 230 will be primarily directed to flicker in the 6–7 Hz range as such flicker is generally the most problematic from the supply utility's perspective.

In one embodiment, the process controller 228 is configured to monitor the on-going status of total flicker emissions during a production period (for example a day), and periodically adjust throughout the production period the filters 234, 244, 250, 252, and/or other variables such as process cycle ramp up speed and set-point power in order to maximize flicker emissions within the permissible limit that is set for the production period.

Tunable filters can also be used to filter the inputs to the real power stabilizer 28 to focus the operation of the real power stabilizer throughout the process cycle depending on monitored voltage flicker or other process variables.

In addition to, or in some embodiments in place of, monitored voltage flicker, other criteria could be used by the process controller 228 as a basis for controlling the operation of the current and reactive power stabilizers. For example, the process controller could take time into the bucket heat into consideration when tuning the filters 234, 244, 250 and 252.

By operating in the manner described above, improved flicker reduction can be accomplished as the inductive shunt and series reactors and their respective controllers are targeted to reduce flicker within fluctuation ranges that each are more suited to suppress. Thus, the attributes of each of the components are used to their respective advantages. The use of filters in the current and reactive power stabilizers permits each to discriminate with respect to the frequency fluctuations that they react to. The tunability of the filters by the process controller 228 allow the filter ranges and center frequencies to be adjusted in response to changes in the measured flicker during the melting process cycle.

As the inductive shunt reactor 200 is not used as a primary source of flicker control during bore-in, it can be smaller than conventional SVC system (for example it could be smaller than the conventional SVC sizing of 125% to 150% required when the SVC is the primary source of flicker reduction used during bore-in when the furnace reactive power swings vary from zero to 200% of the furnace transformer rating).

In the illustrated embodiment, a three electrode furnace has been described in which the variable reactors 16 are located outside the delta enclosure of the furnace transformer. It will be understood that the control system of the present invention could also be used adapted for other arc furnace configurations. For example, with appropriate modification that will be apparent to those skilled in the art, the control system could be used to deliver similar benefits in furnace in which multiple electrodes were associated with each phase, such as a six electrode furnace in which a pair of electrodes 12 is associated with each phase. Also, although the embodiment described above has focussed on flicker reduction in melting furnaces (for example scrap furnaces), the invention could also be applied to smelting furnaces during start up and normal operation when voltage flicker varies with the process. Furthermore, the current, reactive power and real power control aspects of the invention could be applied to stabilize voltage fluctuations resulting from non-arc furnace loads as well, for example, loads such as non-arcing smelting furnaces, and large industrial drives such as mine hoists.

Although the variable reactors 16 and 208 have been shown as a single pair of thyristor switches, it will be appreciated that other configurations could be used, such as a multi-stage thyristor switches for example. Alternatively, other types of power semiconductor switches could be used in the place of thyristors, and other types of variable inductances used as well. In some embodiments, it may be possible to use a synchronous machine, rather than a capacitive filter bank, in combination with an inductive parallel reactor to provide relative power stabilization.

It will be appreciated that although the power control system has been illustrated in the Figures and described above as a number of separate blocks (228, 230, 232, 28, 46 and 48), some or all of the control system features could be combined and performed on a single or reduced number of suitably configured PC's or other microprocessor or logic based devices. The control system components may be implemented using computer systems, or alternatively may be implemented in hardware using either a combination of microprocessors or other specially designed application specific integrated circuits, programmable logic devices, or various combinations thereof.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

We claim:

1. A power control system for reducing voltage flicker in an AC power supply line having a time-varying load connected thereto, comprising:
    a first variable inductive reactor intermediate the power supply line and the load;
    a second variable reactor connected in parallel with the power supply line; and
    a control system for:
        (i) monitoring load current and adjusting the first variable inductive reactor in response to changes in the monitored load current to reduce voltage flicker; and
        (ii) monitoring reactive power draw from the AC power supply line and adjusting the second variable reactor in response to changes in the monitored reactive power draw to reduce voltage flicker.

2. The power control system of claim 1 wherein the control system is configured to adjust the first variable inductive reactor in response to fluctuations in the monitored load current having a frequency within a first frequency range and to adjust the second variable reactor in response to fluctuations in the monitored reactive power draw having a frequency within a second frequency range that is different than the first frequency range.

3. The power control system of claim 2 wherein at least a portion of the second frequency range is higher than the first frequency range.

4. The power control system of claim 2 wherein an upper frequency portion of the first frequency range overlaps with a lower frequency portion of the second frequency range.

5. The power control system of claim 2 wherein the load includes an electric arc of an electric arc furnace and the first frequency range includes a low frequency range that corresponds to current fluctuations that are associated with arc ignition, and the second frequency range is configured to substantially exclude fluctuations in the reactive power draw associated with arc ignition.

6. The power control system of claim 5 wherein the second frequency range includes 5 to 7 Hz.

7. The power control system of claim 1 wherein the load includes an electric arc furnace and the control system is configured to adjust the first variable reactor in response to variations in the monitored electrode current during electrode bore-in of a melting process cycle, and to adjust the second variable reactor in response to variations in the monitored reactive power draw during the melting process cycle after the electrode bore-in.

8. The power control system of claim 1 wherein the control system includes:
    a first filter for filtering signals representative of the load current to output a first current signal representative of load current fluctuations falling within a first frequency range, the control system being configured to adjust the first variable reactor in response to the first current signal;
    second and third filters for filtering signals representative of the load current and a supply voltage to output, respectively, a second current signal representative of load current fluctuations and a voltage signal representative of supply voltage fluctuations falling within a second frequency range, the control system being configured to determine the monitored reactive power based on the second current signal and the voltage signal.

9. The power control system of claim 8 wherein the first, second and third filters are tunable filters and the control system is configured to monitor a time-varying property of the AC power supply line and tune at least some of the first, second and third filters in response to the monitored time-varying property.

10. The power control system of claim 9 wherein the control system includes a flicker meter for measuring fluctuations in line voltage on the AC power supply line and is configured to adjust the tunable filters to change the respective frequency ranges based on the measured fluctuations in line voltage.

11. The power control system of claim 9 wherein the control system is configured to cumulatively track flicker emissions and adjust the tunable filters to maximize flicker emissions within a pre-determined cumulative limit for a time period.

12. The power control system of claim 8 wherein the control system is configured to adjust the first variable inductive reactor so that the monitored load current tracks a current set-point and to adjust the second variable reactor so that a cumulative reactive power draw of the second variable reactor, the first variable inductive reactor and the load is substantially zero.

13. The power control system of claim 1 wherein the control system is configured to monitor impedance of the load and to selectively adjust the first variable inductive reactor either in response to changes in the monitored load current to track a current set-point or in response to changes in the monitored load impedance to track a real power set-point.

14. The power control system of claim 13 wherein the control system is configured to monitor voltage flicker on the AC power supply line and to adjust the first variable inductive reactor to track the current set-point when the monitored voltage flicker exceeds a threshold, and to track the real power set-point when the monitored voltage flicker is below the threshold.

15. The power control system of claim 1 wherein the second variable reactor includes a capacitive harmonic filter bank connected in parallel with the AC power supply line and a variable inductive reactor connected in parallel with the AC power supply line.

16. A power control system for an AC electric arc furnace having an AC power supply line for applying power to an electrode, comprising:
  a variable inductive series reactor connected intermediate the power supply line and the electrode;
  a variable inductive parallel reactor connected in parallel with the power supply line;
  a harmonic capacitive filter bank connected in parallel with the power supply line;
  a control system for mitigating voltage flicker on the power supply line, including:
    (i) current stabilizing means for adjusting the inductive series reactor to stabilize an electrode current to control the voltage flicker;
    (ii) reactive power stabilizing means for adjusting the inductive parallel reactor to stabilize a reactive power draw from the AC power supply line to control the voltage flicker; and
    (iii) control means for monitoring voltage flicker on the power supply line and adjusting operating parameters of the current stabilizing means and the reactive power stabilizing means based on the monitored voltage flicker.

17. The power control system of claim 16 wherein at least one of the current stabilizing means and reactive power stabilizing means includes frequency discrimination means such that at least one of the stabilizing means is more responsive to reducing voltage flicker within a selected frequency range than outside the selected frequency range.

18. The power control system of claim 16 wherein the current stabilizing means includes filter means so that the current stabilizing means is directed towards substantially reducing voltage flicker occurring within a first selected fluctuation range, and the reactive power stabilizing means includes further filter means so that the reactive power stabilizer is directed towards substantially reducing voltage flicker occurring within a second selected fluctuation range.

19. The power control system of claim 18 wherein at least a portion of the first and second selected fluctuation ranges overlap and the filter means are adjustable by the control means in response to changes in the monitored flicker voltage.

20. The power control system of claim 16 wherein the current stabilizing means includes electrode current monitoring means for monitoring the electrode current and means for adjusting the variable inductive series reactor so that the monitored electrode current tracks a current set-point, and the reactive power stabilizing means includes means for monitoring a value representative of a reactive power draw from the power supply line and means for adjusting the variable inductive parallel reactor so that the cumulative reactance of the variable inductive parallel reactor, the harmonic capacitive filter bank, the variable inductive serial reactor, and the electric arc furnace is within a predetermined threshold.

21. The power control system of claim 20 wherein the current stabilizing means includes a tunable filter for substantially limiting the monitored electrode current to current fluctuations falling within a selected current fluctuation range, and the reactive power stabilizing means includes tunable filters for substantially limiting the monitored reactive power draw to reactive power draw fluctuations falling within a selected reactive power draw fluctuation range, at least some of the tunable filters being tunable by the control means based on the monitored voltage flicker.

22. The power control system of claim 16 further including an electrode movement device for adjusting the electrode height relative to a furnace vessel, and an electrode position controller for controlling the operation of the electrode movement device, the electrode position controller being configured to monitor an electrode voltage and adjust the electrode height to stabilize the electrode voltage.

23. The power control system of claim 22 wherein the electrode position controller includes a filter to limit the monitored electrode voltage to voltage fluctuations falling within a selected fluctuation range.

24. The power control system of claim 22 wherein the load includes an arc electrode of an electric arc furnace, including an electrode movement device for adjusting the electrode height relative to a furnace vessel, and an electrode position controller for controlling the operation of the electrode movement device, the electrode position controller being configured to (i) monitor an electrode voltage and adjust the electrode height to stabilize the electrode voltage when the monitored voltage flicker is above a value; and (ii) monitor an electrode impedance and adjust the electrode height to stabilize the electrode impedance when the monitored voltage flicker is below the value.

25. A method for controlling voltage flicker in an AC power supply line having a time-varying load connected thereto, comprising:
  (a) providing a variable inductive series reactor intermediate the power supply line and the load;
  (b) providing a variable parallel reactor in parallel with the power supply line;
  (c) varying an inductance of the variable inductive series reactor to reduce voltage flicker; and
  (d) varying a reactance of the variable parallel reactor to reduce voltage flicker.

26. The method of claim 25 wherein in step (c) the inductance of the variable inductance series reactor is varied to reduce voltage flicker occurring primarily within a selected first frequency range, and in step (d) the reactance of the variable parallel reactor is varied to reduce voltage flicker occurring primarily within a selected second frequency range.

27. The method of claim 26 wherein the first and second frequency ranges overlap, the second frequency range including higher frequencies than the first frequency range.

28. The method of claim 26 further including monitoring the voltage flicker in the power supply line and adjusting at least one of said first frequency range and said second frequency range in response to changes in the monitored voltage flicker.

29. The method of claim 28 including determining when the monitored voltage flicker falls below a predetermined threshold and subsequently varying the inductance of the variable inductance series reactor to primarily reduce variations in real power draw from the power supply line rather than to primarily reduce voltage flicker.

30. The method of claim 26 wherein step (c) includes monitoring a load current and adjusting the inductance of the variable inductance series reactor to match the monitored load current to a current set-point, and step (d) includes monitoring a reactive draw on the power supply line and adjusting the reactance of the variable parallel reactor to match the monitored reactive draw to a predetermined value.

31. The method of claim 30 wherein the variable parallel reactor includes a capacitive reactor connected in parallel with the power supply line and a variable inductive reactor connected in parallel with the power supply line.

32. The method of claim 25 wherein the load includes an arc electrode of an AC electric arc furnace, and step (c) includes varying the variable inductive series reactor to reduce low frequency voltage flicker occurring during electrode bore-in, and step (c) includes varying the variable parallel reactor to reduce higher frequency voltage flicker occurring after electrode bore-in.

33. A power control system for an AC power supply line having a time-varying load connected thereto, comprising:
 a variable inductive reactor intermediate the power supply line and the load; and
 a control system including:
  a flicker meter for monitoring voltage flicker on the AC power supply line;
  a current stabilizer for varying the variable inductive reactor to stabilize a current draw from the power supply line to reduce voltage flicker on the power supply line when the monitored voltage flicker is above a threshold; and
  a real power stabilizer for varying the variable inductive reactor to stabilize a real power draw from the power supply line when the monitored voltage flicker is below the threshold.

34. A method for controlling voltage flicker in an AC power supply line having a time-varying load connected thereto with a variable inductance series reactor intermediate the power supply line and the load, comprising:
 (a) monitoring voltage flicker on the power supply line;
 (b) monitoring a load current drawn by the load and monitoring a load voltage;
 (c) when the monitored voltage flicker indicates that the voltage flicker exceeds a predetermined threshold, varying the inductance of the series reactor in response to variations in the monitored current to stabilize the load current and thereby reduce the voltage flicker; and
 (d) when the monitored voltage flicker indicates that the voltage flicker does not exceed the predetermined threshold, varying the inductance of the series reactor in response to variations in the monitored load current and monitored load voltage to stabilize an impedance of the load and thereby reduce variations in the active power drawn from the power supply line.

35. A power control system for reducing voltage flicker in an AC power supply line having a time-varying load connected thereto, comprising:
 a variable inductive reactor connected in parallel with the power supply line;
 a harmonic capacitive filter bank connected in parallel with the power supply line;
 a flicker meter for monitoring voltage flicker on the power supply line; and
 a controller for monitoring variations in a reactive power draw from the power supply line, selecting only those variations falling within a predetermined frequency range, and adjusting the variable inductive reactor in response to the selected variations to stabilize cumulative reactive power draw of the load, the variable inductive reactor and the capacitive reactor, the controller being responsive to the flicker meter to vary the predetermined frequency range in response to variations in the monitored voltage flicker.

36. The power control system of claim 35 wherein the controller includes a digitally tuned filter means for selecting the selected variations.

37. The power control system of claim 35 wherein the controller includes a digitally tuned filter means for selecting the selected variations.

38. A power control system for reducing voltage flicker in an AC power supply line having a time-varying load connected thereto, comprising:
 a variable inductive reactor connected intermediate the power supply line and the load;
 a flicker meter for monitoring voltage flicker on the power supply line; and
 a controller for monitoring variations in the current draw by the load, selecting only those variations falling within a predetermined frequency range, and adjusting the variable inductive reactor in response to the selected variations to stabilize the current draw of the load, the controller being responsive to the flicker meter to vary the predetermined frequency range in response to variations in the monitored voltage flicker.

* * * * *